United States Patent
Sato et al.

(10) Patent No.: US 8,615,876 B2
(45) Date of Patent: Dec. 31, 2013

(54) METHOD FOR MANUFACTURING HONEYCOMB STRUCTURAL BODY AND METHOD FOR MANUFACTURING EXHAUST GAS CONVERTING APPARATUS

(75) Inventors: Hiroki Sato, Ibi-Gun (JP); Yuki Fujita, Ibi-Gun (JP); Hikaru Yoshida, Ibi-Gun (JP); Takehiro Umemoto, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 532 days.

(21) Appl. No.: 12/909,843

(22) Filed: Oct. 22, 2010

(65) Prior Publication Data

US 2011/0113614 A1    May 19, 2011

(30) Foreign Application Priority Data

Nov. 19, 2009  (WO) .................. PCT/JP2009/069657

(51) Int. Cl.
  *B01J 23/58*  (2006.01)
(52) U.S. Cl.
  USPC .......................... 29/890; 29/890.03; 29/419.1
(58) Field of Classification Search
  USPC ......... 29/890, 890.03, 890.053, 419.1, 527.1, 29/527.2
  See application file for complete search history.

(56) References Cited

U.S. PATENT DOCUMENTS

| | | |
|---|---|---|
| 2004/0166035 A1 | 8/2004 | Noda et al. |
| 2006/0052233 A1 | 3/2006 | Beeckman et al. |
| 2006/0292044 A1 | 12/2006 | Ohno et al. |
| 2007/0259770 A1 | 11/2007 | Hofmann et al. |
| 2007/0269352 A1 | 11/2007 | Miyairi et al. |
| 2009/0239744 A1* | 9/2009 | Ohno et al. ................... 502/328 |
| 2009/0243150 A1 | 10/2009 | Koketsu |

FOREIGN PATENT DOCUMENTS

| | | |
|---|---|---|
| JP | 5-285929 | 11/1993 |
| JP | 2003/033664 | 2/2003 |
| JP | 2003-053719 | 2/2003 |
| JP | 2007-296514 | 11/2007 |
| JP | 2007-296521 | 11/2007 |
| JP | 2009-233938 | 10/2009 |
| WO | WO 2006/137149 | 12/2006 |

OTHER PUBLICATIONS

Extended European Search Report for corresponding EP Application No. 10174472.0-2111, Jan. 31, 2011.

* cited by examiner

*Primary Examiner* — David Bryant
*Assistant Examiner* — Christopher Besler
(74) *Attorney, Agent, or Firm* — Ditthavong Mori & Steiner, P.C.

(57) ABSTRACT

A method for manufacturing a honeycomb structural body having a honeycomb unit includes obtaining a honeycomb molded body including a compound containing a phosphate group zeolite and an inorganic binder. The honeycomb molded body has a plurality of through holes that are defined by cell walls and arranged in a longitudinal direction of the honeycomb molded body. The honeycomb molded body is dried. The dried honeycomb molded body is fired to obtain the honeycomb unit. At least one of the honeycomb unit and the dried honeycomb molded body is stored so that a difference in moisture content is approximately 5 mass % or less between a moisture content of the cell walls at a center part of a cross section perpendicular to the longitudinal direction and a moisture content of the cell walls at an outer periphery part of the cross section perpendicular to the longitudinal direction.

50 Claims, 2 Drawing Sheets

EXHAUST GAS

METHOD FOR MANUFACTURING HONEYCOMB STRUCTURAL BODY AND METHOD FOR MANUFACTURING EXHAUST GAS CONVERTING APPARATUS

CROSS-REFERENCE TO RELATED APPLICATION

The present application claims priority under 35 U.S.C. §119 to International Application No. PCT/JP2009/069657, filed on Nov. 19, 2009. The contents of this application are incorporated herein by reference in their entirety.

BACKGROUND OF THE INVENTION

1. Technical Field

The present invention relates to a method for manufacturing a honeycomb structural body and a method for manufacturing an exhaust gas converting apparatus.

2. Background Art

Conventionally, as one of the automotive exhaust gas converting systems, an SCR (Selective Catalytic Reduction) system has been known in which NOx is reduced to nitrogen and water by using ammonia.

In the SCR system, zeolite is known as a material for absorbing ammonia.

In WO06/137149A1, a honeycomb structural body including honeycomb unit is disclosed. The honeycomb unit includes inorganic particles and inorganic fibers and/or inorganic whiskers. The inorganic particles are selected from one or more materials of a group of alumina, silica, zirconia, titania, ceria, mullite, and zeolite.

The contents of International Patent Publication No. WO06/137149A1 are incorporated herein.

SUMMARY OF THE INVENTION

According to one aspect of the present invention, a method for manufacturing a honeycomb structural body including a honeycomb unit includes obtaining a honeycomb molded body including a compound containing a phosphate group zeolite and an inorganic binder. The honeycomb molded body has a plurality of through holes that are defined by cell walls and arranged in a longitudinal direction of the honeycomb molded body. The honeycomb molded body is dried. The dried honeycomb molded body is fired to obtain the honeycomb unit. At least one of the honeycomb unit and the dried honeycomb molded body is stored so that a difference in moisture content is approximately 5 mass % or less between a moisture content of the cell walls at a center part of a cross section perpendicular to the longitudinal direction and a moisture content of the cell walls at an outer periphery part of the cross section perpendicular to the longitudinal direction.

According to another aspect of the present invention, a method for manufacturing an exhaust gas converting apparatus includes manufacturing a honeycomb structural body by using the method for manufacturing a honeycomb structural body as claimed in claim 1. The honeycomb structural body is installed into a metal container in a state where a holding sealing member is provided at a periphery of the honeycomb structural body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

With the conventional honeycomb structural body of WO06/137149A1, it is desired that the NOx conversion efficiency be higher than a case where zeolite included in the honeycomb unit is used as the inorganic material including the honeycomb unit. For example, phosphate group zeolite (e.g., SAPO or the like) having high NOx conversion efficiency may be used as the zeolite. However, because water is absorbed by SAPO, for example, the crystal lattice constant of SAPO changes. Therefore, a honeycomb structural body or an intermediate product of the honeycomb structural body including a honeycomb unit containing SAPO has a problem of being easily breakable due to water absorbed to and/or desorbed from the honeycomb unit.

An embodiment of the present invention can provide a method for manufacturing a honeycomb structural body and a method for manufacturing an exhaust gas converting apparatus that can prevent a honeycomb unit from being broken by absorbing and/or desorbing of water.

In the following, embodiments of the present invention are described with reference to the accompanying drawings.

Figure 1:
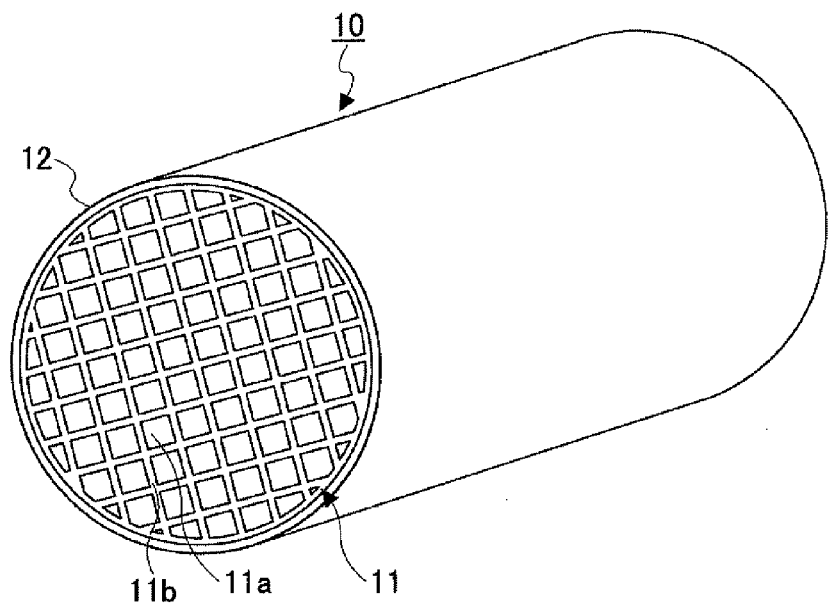
FIG. 1 is a perspective view illustrating an example of a honeycomb structural body according to an embodiment of the present invention.

As one example of a method for manufacturing a honeycomb structural body according to an embodiment of the present invention, a method for manufacturing a honeycomb structural body 10 (see FIG. 1) is described. First, a raw substantially cylindrical honeycomb molded body, in which plural through holes separated by walls are formed in parallel in a longitudinal direction, is manufactured by performing extrusion molding using a raw material paste (compound) containing a phosphate group zeolite and an inorganic binder. Thereby, it becomes easy for a substantially cylindrical honeycomb unit 11 having sufficient strength to be formed even if firing temperature is low.

The phosphate group zeolite may be, for example, a SAPO (e.g., SAPO-5, SAPO-11, SAPO-34 and the like), a MeAPO, a MeAPSO and the like.

Considering the NOx conversion efficiency, it is preferable for the phosphate group zeolite to include a phosphate group zeolite being ion-exchanged with Cu and/or Fe. It is to be noted that the phosphate group zeolite may also include a phosphate group zeolite which is not ion-exchanged and/or a phosphate group zeolite ion-exchanged with a metal other than those described above.

The phosphate group zeolite being ion-exchanged with Cu and/or Fe is preferred to have an ion exchange amount from approximately 1.0 to approximately 5.0 mass %. In a case where the ion exchange amount of the phosphate group zeolite is equal to or more than approximately 1.0 mass %, it becomes difficult for the NOx conversion efficiency to become insufficient. On the other hand, in a case where the ion exchange amount of the phosphate group zeolite is equal to or less than approximately 5.0 mass %, it becomes difficult for the metal to be ion-exchanged to remain as oxide and becomes positively easy to be ion-exchanged.

The average particle diameter of the primary or secondary particles of the phosphate group zeolite is preferred to be approximately 0.5 to approximately 10 μm, and more preferably approximately 1 to approximately 5 μm. In a case where the average particle diameter of the primary or secondary particles of the phosphate group zeolite is equal to or more than approximately 0.5 μm, it becomes easy for exhaust gas to permeate through the inside of a cell wall 11b such that the phosphate group zeolite can easily be effectively used for NOx conversion. On the other hand, in a case where the average particle diameter of the primary or secondary particles of the phosphate group zeolite is equal to or less than approximately 10 μm, it becomes difficult for the number of pores of the honeycomb unit 11 to decrease. Accordingly, it becomes easy for exhaust gas to permeate through the inside of the cell wall 11b such that the phosphate group zeolite can easily be effectively used for NOx conversion.

The raw material paste may further include zeolite other than the phosphate group zeolite such as β type zeolite or ZSM-5 type zeolite.

The honeycomb unit 11 is preferred to have a zeolite content by weight per apparent volume from approximately 230 to approximately 360 g/L. In a case where the zeolite content by weight per apparent volume is equal to or more than approximately 230 g/L, there is no need for the apparent volume of the honeycomb unit 11 to be increased in order to improve the NOx conversion efficiency. On the other hand, in a case where the zeolite content by weight per apparent volume is equal to or less than approximately 360 g/L, it becomes difficult for the strength of the honeycomb unit 11 to become insufficient.

An inorganic binder(s) included in the raw material paste is added as, alumina sol, silica sol, titania sol, soluble glass (water glass), sepiolite, attapulgite, or boehmite. Two or more kinds of inorganic binders may be used.

The content of the inorganic binder of the honeycomb unit 11 is preferably approximately 5 to approximately 30 mass % as solid content, and more preferably approximately 10 to approximately 20 mass % as solid content. In a case where the content of the inorganic binder is equal to or more than approximately 5 mass % as solid content, it becomes difficult for the strength of the honeycomb unit 11 to decrease. On the other hand, in a case where the content of the inorganic binder is equal to or less than 30 mass % as solid content, it becomes easy to perform extrusion molding of the honeycomb unit 11.

In order to increase the strength of the honeycomb unit 11, it is preferable for the raw material paste to further include an inorganic fiber and/or a scale-like material.

The inorganic fiber included in the raw material paste is not limited to a particular material as long as the strength of the honeycomb unit 11 can be increased. The inorganic fiber may be, for example, alumina fibers, silica fibers, silicon carbide fibers, silica alumina fibers, glass fibers, potassium titanate fibers, aluminum borate fibers and the like. Two or more kinds of inorganic fibers may be used.

The aspect ratio of the inorganic fibers is preferably approximately 2 to approximately 1000, more preferably, approximately 5 to approximately 800, and still more preferably, approximately 10 to approximately 500. In a case where the aspect ratio of the inorganic fibers is equal to or more than approximately 2, it becomes difficult for the effect of increasing the strength of the honeycomb unit 11 to be low. On the other hand, in a case where the aspect ratio of the inorganic fibers is equal to or less than approximately 1000, it becomes difficult for clogging or the like, for example, to occur in the molding die when performing extrusion molding for forming the honeycomb unit 11. Further, it becomes difficult for breakage of the inorganic fibers to occur, such that it becomes difficult for the effect of increasing the strength of the honeycomb unit 11 to be low.

The scale-like material included in the raw material paste is not to be limited to a particular material as long as the strength of the honeycomb unit 11 can be increased. The scale-like material may be, for example, glass, muscovite, alumina, silica, zinc oxide and the like. Two or more kinds of the scale-like material may be used.

The content of the inorganic fibers and the scale-like material in the honeycomb unit 11 is preferably approximately 3 to approximately 50 mass %, more preferably, approximately 3 to approximately 30 mass %, and still more preferably, approximately 5 to approximately 20 mass %. In a case where the content of the inorganic fibers and the scale-like material is equal to or more than approximately 3 mass %, it becomes difficult for the effect of increasing the strength of the honeycomb unit 11 to be low. On the other hand, in a case where the content of the inorganic fibers and the scale-like material is equal to or less than approximately 50 mass %, it becomes difficult for the content of the phosphate group zeolite inside the honeycomb unit 11 to decrease such that it becomes difficult for the NOx conversion efficiency to be low.

Further, an organic binder, a dispersion medium, a molding aid, and the like may be arbitrarily added to the raw material paste, if necessary.

The organic binder is not limited in particular. The organic binder may be, for example, methylcellulose, carboxymethyl cellulose, hydroxyethyl cellulose, polyethyleneglycole, phenol resin, epoxy resin and the like. Two or more kinds of organic binders may be used. The adding amount of the organic binder is preferably approximately 1 to approximately 10 wt % of the total weight of the zeolite, the inorganic binder, the inorganic fibers, and the scale-like particles.

The dispersion medium is not limited in particular. The dispersion medium may be, for example, an organic solvent such as water and benzene, alcohol such as methanol, and the like. Two or more kinds of dispersion media may be used.

The molding aid is not limited in particular. The molding aid may be, for example, ethylene glycol, dextrin, fatty acid, fatty acid soap, polyalcohol and the like. Two or more kinds of molding aids may be used.

When the raw material paste is prepared, it is preferable to be mixed, kneaded and the like. The raw material paste can be mixed by using a mixer, an attritor (grinding mill), or the like, and can be kneaded by a kneader or the like.

Next, the obtained honeycomb molded body is dried by using a drying apparatus such as a microwave drying apparatus, a hot air drying apparatus, a dielectric drying apparatus, a reduced pressure drying apparatus, a vacuum drying apparatus, and a freeze drying apparatus.

In a case of storing the dried honeycomb molded body, it is preferable to store the honeycomb molded body so that the difference of the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body is approximately 5 mass % or less, and more preferably approximately 3 mass % or less. In a case where the moisture content is equal to or less than approximately 5 mass %, it becomes difficult for the honeycomb molded body to be broken.

As for the method of storing the honeycomb molded body so that the difference of the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body is approximately 5 mass % or less, the method is not limited in particular. The method may be, for example, a method of allowing air to flow through the plural through holes of the honeycomb molded body in a storage atmosphere where the air or humidity is approximately 20 to approximately 60% RH (more preferably approximately 20 to approximately 50% RH), a method of storing the honeycomb molded body inside a dessicator or a vacuum container, or the like.

In this case where air is allowed to flow through the plural through holes of the honeycomb molded body, the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body are substantially equal.

Further, in the case where the air having a humidity of approximately 20 to approximately 60% RH is allowed to flow through the plural through holes of the honeycomb molded body, the difference between the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body becomes approximately 5 mass % or less. In a case where the humidity of the air flowing through the plural through holes is equal to or more than approximately 20% RH or in a case where the humidity of the air flowing through the plural through holes is equal to or less than approximately 60% RH, it may become difficult for the difference between the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body to become more than approximately 5 mass % (although it also may depend on the humidity of the atmosphere).

In a case where air is allowed to flow through the plural through holes of the honeycomb molded body stored in an atmosphere where the air or the humidity is approximately 20% RH to approximately 60% RH, the temperature of the storage atmosphere is normally approximately 5° C. to approximately 35° C.

Further, in a case where the honeycomb molded body is stored inside a dessicator or a vacuum container, the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body become substantially equal.

The moisture content can be measured by using a dry weight method. Further, the moisture content may also be measured by using, for example, a near infrared moisture meter, an electrostatic capacitance moisture meter or the like.

Further, the obtained honeycomb molded body is degreased. The degreasing conditions are not particularly limited and can be arbitrarily selected depending on the amount and kind of organic substances contained in the honeycomb molded body. However, the honeycomb molded body is preferably degreased at approximately 400° C. for approximately 2 hours.

Then, by firing the degreased honeycomb molded body, the honeycomb unit 11 having the substantially cylindrical shape is obtained. The firing temperature is preferably approximately 600 to approximately 1200° C., and more preferably approximately 600 to approximately 1000° C. In a case where the firing temperature is equal to or more than approximately 600° C., it becomes easy for the sintering to progress, such that it becomes difficult for the strength of the honeycomb unit 11 to become low. On the other hand, in a case where the firing temperature is equal to or less than approximately 1200° C., the sintering does not excessively progress such that it is difficult for the reactive sites of the phosphate group zeolite to decrease.

In a case of storing the honeycomb unit 11, the honeycomb unit 11 is to be stored so that the difference between the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body is approximately 5 mass % or less, and more preferably approximately 3 mass % or less. In a case where the moisture content is equal to or less than approximately 5 mass %, it becomes difficult for the honeycomb unit 11 to be broken.

The method of storing the honeycomb unit 11 so that the difference between the moisture content of a cell wall at the outer periphery part of a cross section perpendicular to the longitudinal direction of the honeycomb molded body and the moisture content of a cell wall at the center part of a cross section perpendicular to the longitudinal direction of the honeycomb molded body is 5 mass % or less is the same as that of storing the honeycomb molded body.

The dried honeycomb molded body may be degreased and fired without being stored. Further, the step of firing the honeycomb molded body may include the steps of drying the honeycomb molded body and degreasing the honeycomb molded body.

Then, an outer peripheral coating layer paste is applied onto an outer peripheral surface of the substantially cylindrical honeycomb unit 11.

The outer peripheral coating layer paste is not limited in particular. The outer peripheral coating layer paste may be, for example, a mixture of an inorganic binder and inorganic particles, a mixture of the inorganic binder and inorganic fibers, or a mixture of the inorganic binder, the inorganic particles, and the inorganic fibers, or the like.

Further, the outer peripheral coating layer paste may further contain an organic binder. The organic binder is not limited in particular. The organic binder may be, for example, polyvinyl alcohol, methylcellulose, ethylcellulose, carboxymethyl cellulose and the like. Two or more kinds of the organic binders may be used.

Then, by drying and solidifying the honeycomb unit 11 having the outer peripheral coating layer paste applied thereto, the honeycomb structural body 10 having the substantially cylindrical shape is obtained. In a case where the outer peripheral coating layer paste contains an organic binder, a degreasing process is preferably performed on the honeycomb structural body 10. The degreasing conditions can be arbitrarily selected depending on the amount and kind of organic substances. However, the degreasing conditions are preferably at approximately 700° C. for approximately 20 minutes.

By having the honeycomb unit 11 steeped into a solution containing Cu ions or Fe ions, the zeolite can be ion exchanged. Further, a raw material paste containing the zeolite being ion exchanged by Cu and/or Fe may be used.

The honeycomb structural body 10 has an outer peripheral coating layer 12 formed on an outer peripheral surface of a single honeycomb unit 11 including plural through holes 11a partitioned by cell walls 11b and arranged in a longitudinal direction thereof.

The honeycomb unit 11 preferably has a porosity of approximately 25 to approximately 40%. In a case where the porosity of the honeycomb unit 11 is less than approximately equal to or more than 25%, it is easy for allowing exhaust gas to permeate into the cell walls 11b. Thus, the phosphate group zeolite can easily be effectively used for NOx conversion. On the other hand, in a case where the porosity of the honeycomb unit 11 is equal to or less than approximately 40%, it becomes difficult for the strength of the honeycomb unit 11 to become insufficient.

The aperture ratio of a cross section of the honeycomb unit 11 perpendicular to the longitudinal direction of the honeycomb unit 11 is preferably approximately 50 to approximately 75%. In a case where the aperture ratio of the cross section perpendicular to the longitudinal direction of the honeycomb unit 11 is equal to or more than approximately 50%, it becomes easy for the NOx conversion by the phosphate group zeolite to be used effectively. On the other hand, in a case where the aperture ratio of the cross section perpendicular to the longitudinal direction of the honeycomb unit 11 is equal to or less than approximately 75%, it becomes difficult for the strength of the honeycomb unit 11 to be insufficient.

The density of the through holes 11a of the cross section perpendicular to the longitudinal direction of the honeycomb unit 11 is preferably approximately 31 to approximately 124 units per $cm^2$. In a case where the density of the through holes 11a of the cross section perpendicular to the longitudinal direction of the honeycomb unit 11 is equal to or more than approximately 31 units per $cm^2$, it becomes easy for exhaust gas and the phosphate group zeolite to make contact. Thus, it becomes difficult for the NOx conversion efficiency to decrease. On the other hand, in a case where the density of the through holes 11a of the cross section perpendicular to the longitudinal direction of the honeycomb unit 11 is equal to or less than approximately 124 units per $cm^2$, it becomes difficult for the pressure loss of the honeycomb structural body 10 may increase.

The thickness of the cell wall 11b of the honeycomb unit 11 is preferably approximately 0.10 to approximately 0.50 mm, and more preferably approximately 0.15 to approximately 0.35 mm. In a case where the thickness of the cell wall 11b is equal to or more than approximately 0.10 mm, it becomes difficult for the strength of the honeycomb unit 11 to decrease. On the other hand, in a case where the thickness of the cell wall 11b is equal to or less than approximately 0.50 mm, it becomes easy for allowing exhaust gas to permeate into the cell wall lib. Thus, the phosphate group zeolite can easily be effectively used for NOx conversion.

The thickness of the outer peripheral coating layer 12 is preferably approximately 0.1 to approximately 2 mm. In a case where the thickness of the outer peripheral coating layer 12 is equal to or more than approximately 0.1 mm, it becomes difficult for the effect of increasing the strength of the honeycomb structural body 10 to become insufficient. On the other hand, in a case where the thickness of the outer peripheral coating layer 12 is equal to or less than 2 mm, it becomes difficult for the content of the phosphate group zeolite per volume unit of the honeycomb structural body 10 to decrease. Thus, it becomes difficult for the NOx conversion efficiency to decrease.

Although the shape of the honeycomb structural body 10 in this embodiment is substantially cylindrical, the shape of the honeycomb structure 10 is not limited in particular. For example, the shape of the honeycomb structure 10 may be a substantially square pillar, a substantially cylindroid or the like. Further, although the shape of the through holes 11a in this embodiment is a substantially square pillar, the shape of the through holes is not limited in particular. The shape of the through holes 11a may be, for example, a substantially triangular pillar, a substantially hexagonal pillar, or the like It is to be noted that the honeycomb structural body 10 may be formed without having the outer peripheral coating layer 12.

Figure 2:
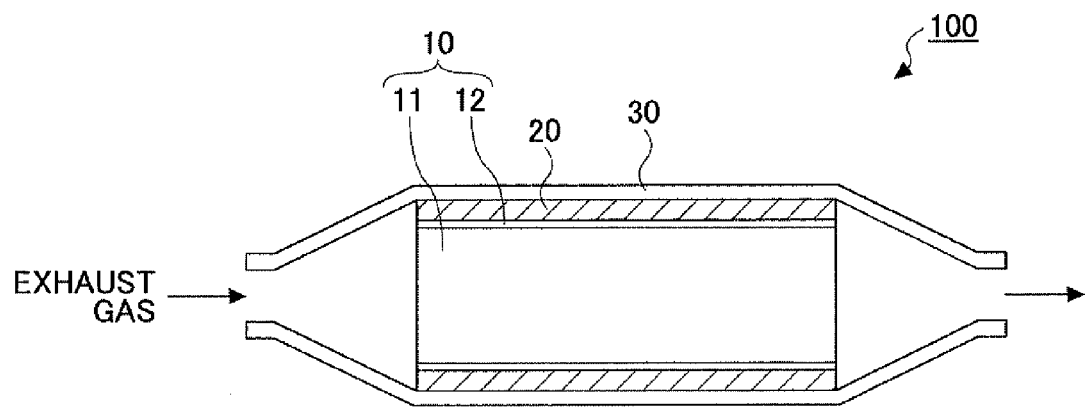
FIG. 2 is a cross-sectional view illustrating an example of an exhaust gas converting apparatus according to an embodiment of the present invention.

In a case where a holding sealing member 20 is provided at an outer peripheral part of the honeycomb structural body 10, an exhaust gas converting apparatus 100 (see FIG. 2) is obtained by canning the honeycomb structural body 10 to a metal pipe 30. In the exhaust gas converting apparatus 100, an ejector (not illustrated) such as an ejection nozzle for ejecting ammonia or a precursor thereof is provided at an upstream side of the honeycomb structural body 10 relative to an exhaust gas flowing direction. Thereby, ammonia is added to the exhaust gas. As a result, the NOx gas included in the exhaust gas is reduced by the phosphate group zeolite included in the honeycomb unit 11. Considering preservation stability of ammonia or the precursor thereof, it is preferable to use urea water as the precursor of ammonia. It is to be noted that ammonia is generated by heating the urea water in the exhaust gas and hydrolyzing the urea water.

In this case, after the honeycomb structural body 10 is canned in a state where the holding sealing member 20 is provided on the outer peripheral part of the honeycomb structural body 10, the exhaust gas converting apparatus 100 may be obtained by firing the honeycomb structural body 10.

Figure 3:
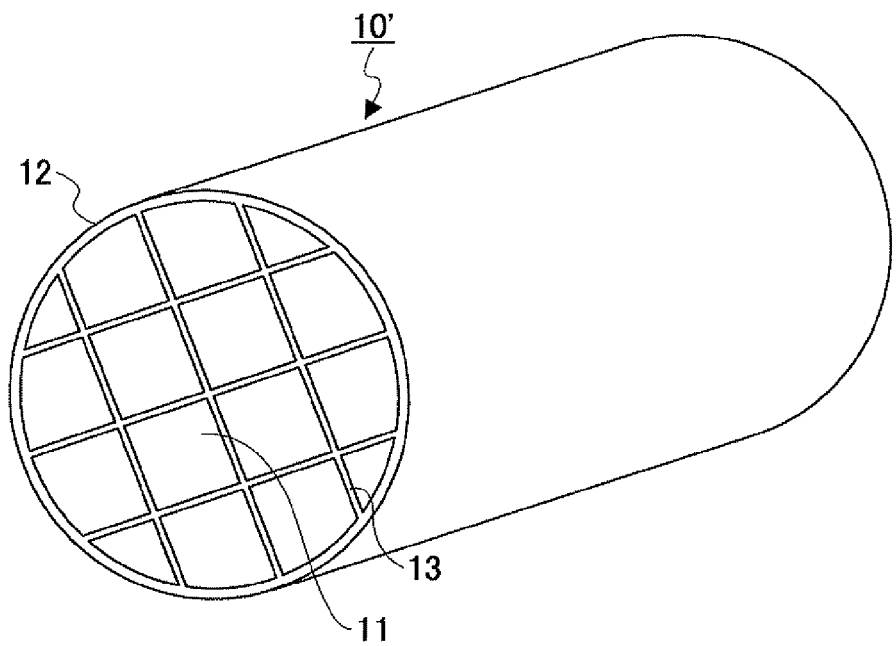
FIG. 3 is a perspective view illustrating other modified example of the honeycomb structural body according to an embodiment of the present invention.

Next, a method for manufacturing a honeycomb structural body 10' (see FIG. 3) is described as a modified example of a method for manufacturing the honeycomb structural body 10. First, in the same manner as the honeycomb structural body 10, a honeycomb unit 11 having a square pillar shape is formed. Then, an adhesive layer paste is applied to the outer peripheral surface of the honeycomb unit 11. Then, such honeycomb units 11 are adhered together and solidified by drying. Thereby, an aggregate of the honeycomb units 11 can be manufactured.

In this case where the aggregate of honeycomb units 11 is manufactured, the aggregate may be cut and polished into a substantially cylindrical shape. Further, honeycomb units 11, which are molded having a fan-shape or a quadrate shape as the cross section perpendicular to the longitudinal direction of the honeycomb unit 11, may be adhered together to form a substantially cylindrical-shaped aggregate of the honeycomb units 11.

The adhesive layer paste is not to be limited in particular. The adhesive layer paste may be, for example, a mixture of an inorganic binder and inorganic particles, a mixture of the inorganic binder and inorganic fibers, a mixture of the inorganic binder, the inorganic particles, and the inorganic fibers, or the like.

Further, the adhesive layer paste may further contain an organic binder. The organic binder is not limited in particular. The organic binder may be, for example, polyvinyl alcohol, methylcellulose, ethylcellulose, or carboxymethyl cellulose and the like. Two or more kinds of the organic binders may be used.

In a case of storing the aggregate of the honeycomb units 11, the difference of the moisture content of a cell wall 11b at the outer periphery part of a cross section perpendicular to the longitudinal direction of a honeycomb unit 11 and the moisture content of a cell wall 11b at the center part of a cross section perpendicular to the longitudinal direction of the aggregate of the honeycomb units 11 is approximately 5 mass % or less, and more preferably approximately 3 mass % or less. In a case where the moisture content is equal to or less than approximately 5 mass %, it becomes difficult for the honeycomb units 11 to be broken.

The method of storing the aggregate of the honeycomb units 11 so that the difference between the moisture content of a cell wall at the outer periphery part of a cross section perpendicular to the longitudinal direction of the honeycomb unit 11 and the moisture content of a cell wall at the center part of a cross section perpendicular to the longitudinal direction of the honeycomb unit is approximately 5 mass % or less is the same as that of storing the honeycomb molded body.

Then, an outer peripheral coating layer paste is applied to an outer peripheral surface of the cylindrical shaped aggregate of the honeycomb units 11. The outer peripheral coating layer paste is not limited in particular. The outer peripheral coating layer paste may be, for example, the same as or different from the material of the adhesive layer paste. Further, the outer peripheral coating layer paste may have the same composition as the adhesive layer paste.

Then, the aggregate of the honeycomb units 11 being coated with the outer peripheral coating layer paste is solidified by drying. Thereby, a cylindrical shaped honeycomb structural body 10' is obtained. In a case where the adhesive layer paste and/or the outer peripheral coating layer paste of the honeycomb structural body 10' contains an organic binder, a degreasing process is preferably performed on the honeycomb structural body 10'. The degreasing conditions can be arbitrarily selected depending on the amount and kind of organic substances. However, the degreasing conditions are preferably at approximately 700° C. for approximately 20 minutes.

Figure 4:
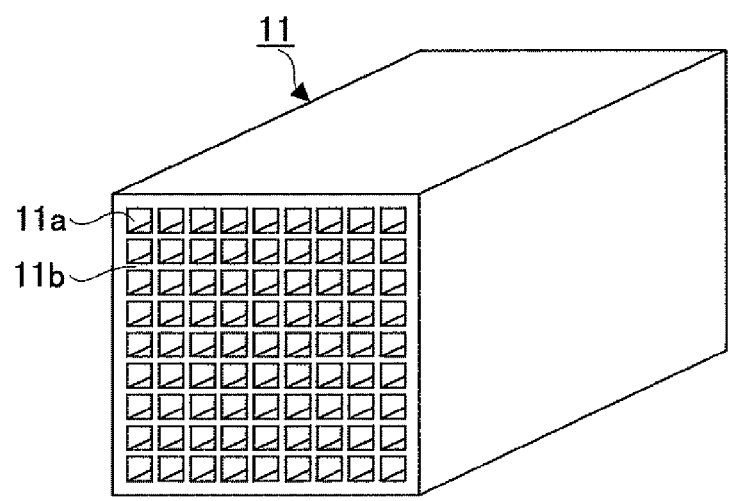
FIG. 4 is a perspective view illustrating the honeycomb unit constituting the honeycomb structural body of FIG. 3.

Other than the adhesive layer 13 adhering plural honeycomb units 11 (see FIG. 4) having plural through holes 11a defined by cell walls 11b and arranged in the longitudinal direction of the honeycomb units 11, the honeycomb structural body 10' is the same as the honeycomb structural body 10.

The cross section of the honeycomb unit 11 perpendicular to the longitudinal direction of the honeycomb unit 11 preferably has an area of approximately 5 to approximately 50 cm$^2$. In a case where the area of the cross section of the honeycomb unit 11 perpendicular to the longitudinal direction of the honeycomb unit is equal to or more than approximately 5 cm$^2$, it becomes difficult for the pressure loss of the honeycomb structural body 10' to increase. On the other hand, in a case where the area of the cross section of the honeycomb unit 11 perpendicular to the longitudinal direction of the honeycomb unit is equal to or less than approximately 50 cm$^2$, it becomes difficult for the strength against thermal stress of the honeycomb unit 11 to be insufficient.

The thickness of the adhesive layer 13 is preferably approximately 0.5 to approximately 2 mm. In a case where the thickness of the adhesive layer 13 is less than approximately 0.5 mm, the adhesive strength may be insufficient. On the other hand, in a case where the thickness of the adhesive layer is equal to or less than approximately 2 mm, it becomes difficult for the pressure loss of the honeycomb structural body 10' to increase.

Further, except for the honeycomb units 11 located at the outer peripheral part of the honeycomb structural body 10', the shape of the honeycomb unit 11 of the structural body 10' is not limited in particular. For example, the shape of the honeycomb unit 11 may be a substantially hexagonal pillar or the like.

It is to be noted that the honeycomb structural body 10' may be formed without the outer peripheral coating layer 12.

EXAMPLES

Example 1

A raw material paste was prepared by mixing and kneading: SAPO (3100 g) being ion-exhanged with Cu of 2.7 mass % and having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Then, extrusion molding was performed on the raw material paste by using an extruder. Thereby, a raw quadrate pillar-shaped honeycomb molded body was obtained. Then, the honeycomb molded body was dried for 10 minutes at 110° C. by using a microwave dryer and a hot air dryer.

The honeycomb molded body was stored in an atmosphere having a temperature of 25° C. and a humidity of 65% RH and the air inside such atmosphere was allowed to flow through the plural through holes of the dried honeycomb molded body at a flow rate of 9.3 m/sec. No cracks were found after storing the honeycomb molded body in such atmosphere for 1 hour. Further, the moisture content of the cell wall at the outer periphery part of a cross section perpendicular to the longitudinal direction of the honeycomb molded body was 14 mass % and the moisture content of a cell wall at the center part of a cross section perpendicular to the longitudinal direction of the honeycomb molded body was 13 mass %.

It is to be noted that the moisture content of the cell wall at the outer periphery part of a cross section perpendicular to the longitudinal direction of the honeycomb molded body and the moisture content of a cell wall at the center part of a cross section perpendicular to the longitudinal direction of the honeycomb molded body were measured by cutting out corresponding samples of 5 mm square and performing a dry weight method on the samples.

Then, after the stored honeycomb molded body is degreased at 400° C. for 5 hours, the degreased honeycomb molded body is fired at 700° C. for 2 hours. Thereby, a honeycomb unit 11 is manufactured having quadrate pillar-shape whose single side is 34.3 mm and length is 150 mm. The honeycomb unit 11 density of the through holes 11a was 93 units/cm$^2$ and the thickness of the cell walls was 0.23 mm.

The honeycomb unit 11 was stored in an atmosphere having a temperature of 25° C. and a humidity of 65% RH and the air of the atmosphere was allowed to flow through the plural through holes of the honeycomb unit 11 at a flow rate of 9.3 m/sec. No cracks where found after storing the honeycomb unit 11 in such atmosphere for 1 hour. Further, the moisture content of the cell wall at the outer periphery part of a cross section perpendicular to the longitudinal direction of the honeycomb unit 11 was 15 mass % and the moisture content of a cell wall at the center part of a cross section perpendicular to the longitudinal direction of the honeycomb unit was 13 mass %.

It is to be noted that the moisture content of the cell wall at the outer periphery part of a cross section perpendicular to the longitudinal direction of the stored honeycomb unit 11 and the moisture content of a cell wall at the center part of a cross section perpendicular to the longitudinal direction of the stored honeycomb unit 11 were measured by cutting out corresponding samples of 5 mm square and performing a dry weight method on the samples.

Then, a heat resistant adhesive layer paste was prepared by mixing and kneading: alumina fiber (767 g) having an average fiber diameter of 0.5 μm and an average fiber length of 15 μm; silica glass (2500 g); carboxyl methylcellulose (17 g); silica sol (600 g) of 30 mass % as solid content; polyvinyl alcohol (167 g); surface active agent (167 g); and alumina balloon (17 g).

16 honeycomb units 11 were adhered together by applying the adhesive layer paste to the honeycomb units 11. The adhesive layer paste is applied so that the thickness of the adhesive layer is 2 mm. The adhesive layer paste was solidified by drying at a temperature of 150° C. for 10 minutes. Then, an aggregate of the honeycomb units 11 was obtained by cutting the honeycomb units 11 into a cylindrical shape with a diamond cutter so that the cross section perpendicular to the longitudinal direction of the honeycomb units 11 becomes substantially point symmetrical.

Then, an adhesive layer paste was applied to the outer peripheral surface of the aggregate of the honeycomb units 11 so that the thickness of the outer peripheral coating layer becomes 1 mm. Then, the adhesive layer paste is solidified by drying the adhesive layer paste at 150° C. for 10 minutes by using a microwave dryer and a hot air dryer and is degreased at 400° C. for 2 hours. Thereby, a honeycomb structural body 10' having a cylindrical shape with a diameter of 143.8 mm and a height of 150 mm was obtained.

Then, the honeycomb structural body 10' was canned to a metal pipe (shell) in a state where the holding sealing member (mat made from inorganic material) 20 is provided on the outer peripheral part of the honeycomb structural body 10'. Thereby, an exhaust gas converting apparatus was obtained (see FIG. 2).

Example 2

Other than storing the dried honeycomb molded body and the honeycomb unit 11 inside a desiccater for 1 hour, the honeycomb structural body 10' and the exhaust gas converting apparatus of Example 2 were manufactured in the same manner as those of the Example 1.

No cracks were found from the stored honeycomb molded body or the honey comb units 11. Further, the moisture content of the cell wall at the outer periphery part of a cross section perpendicular to the longitudinal direction of the stored honeycomb molded body was 2 mass % and the moisture content of a cell wall at the center part of a cross section perpendicular to the longitudinal direction of the stored honeycomb molded body was 2 mass % Further, the moisture content of the cell wall at the outer periphery part of a cross section perpendicular to the longitudinal direction of the stored honeycomb unit 11 was 2 mass % and the moisture content of a cell wall at the center part of a cross section perpendicular to the longitudinal direction of the stored honeycomb unit 11 was 2 mass %.

Example 3

Other than allowing air having a temperature of 25° C. and a humidity of 30% RH to flow through plural through holes of a dried honeycomb molded body or honeycomb unit at a flow rate of 9.3 m/sec for 1 hour in an atmosphere where the temperature is 25° C. and the humidity is 65%, the honeycomb structural body 10' and the exhaust gas converting apparatus of Example 3 were manufactured in the same manner as those of the Example 1.

No cracks were found from the stored honeycomb molded body or the honeycomb units 11. Further, the moisture content of the cell wall at the outer periphery part of a cross section perpendicular to the longitudinal direction of the stored honeycomb molded body was 14 mass % and the moisture content of a cell wall at the center part of a cross section perpendicular to the longitudinal direction of the stored honeycomb molded body was 9 mass %. Further, the moisture content of the cell wall at the outer periphery part of a cross section perpendicular to the longitudinal direction of the stored honeycomb unit 11 was 15 mass % and the moisture content of a cell wall at the center part of a cross section perpendicular to the longitudinal direction of the stored honeycomb unit 11 was 10 mass %.

Comparative Example

A raw material paste was prepared by mixing and kneading: SAPO (3100 g) being ion-exhanged with Cu of 2.7 mass % and having an average particle diameter of 3 μm; boehmite (895 g); alumina fiber (485 g) having an average fiber diameter of 6 μm and an average fiber length of 100 μm; methylcellulose (380 g); oleic acid (280 g); and ion exchanged water (2425 g).

Then, extrusion molding was performed on the raw material paste by using an extruder. Thereby, a raw quadrate pillar-shaped honeycomb molded body was obtained. Then, the honeycomb molded body was dried for 10 minutes at 110° C. by using a microwave dryer and a hot air dryer.

After the dried honeycomb molded body was placed in an atmosphere having a temperature of 25° C. and a humidity of 65% RH for 1 hour, cracks were found. Further, the moisture content of the cell wall at the outer periphery part of a cross section perpendicular to the longitudinal direction of the honeycomb molded body was 14 mass % and the moisture content of a cell wall at the center part of a cross section perpendicular to the longitudinal direction of the honeycomb molded body was 6 mass %.

Evaluation results are illustrated in Table 1.

TABLE 1

| | HONEYCOMB MOLDED BODY | | | HONEYCOMB UNIT | | |
|---|---|---|---|---|---|---|
| | MOISTURE CONTENT OF CELL WALL [MASS %] | | | MOISTURE CONTENT OF CELL WALL [MASS %] | | |
| | OUTER PERIPHERY PART | CENTER PART | CRACK | OUTER PERIPHERY PART | CENTER PART | CRACK |
| EXAMPLE 1 | 14 | 13 | NO | 15 | 13 | NO |
| EXAMPLE 2 | 2 | 2 | NO | 2 | 2 | NO |
| EXAMPLE 3 | 14 | 9 | NO | 15 | 10 | NO |
| COMPARATIVE EXAMPLE 1 | 14 | 6 | YES | — | — | — |

According to Table 1, it can be understood that generation of cracks in the honeycomb unit 11 can be prevented in the cases of manufacturing the honeycomb structural body 10' and the exhaust gas converting apparatus of Examples 1 to 3.

According to the above, it can be understood that, by storing a dried honeycomb molded body and a honeycomb unit 11 in a manner that the difference of the moisture content of the cell wall at the outer periphery part of a cross section perpendicular to the longitudinal direction of the stored honeycomb molded body and the honeycomb unit 11 and the moisture content of a cell wall at the center part of a cross section perpendicular to the longitudinal direction of the stored honeycomb molded body and the honeycomb unit 11 is 5 mass % or less, the honeycomb unit 11 can be prevented from being damaged by adsorption and/or desorption of moisture.

Although this embodiment is described with the honeycomb structural body 10', the same effect can be attained with the honeycomb structural body 10.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for manufacturing a honeycomb structural body comprising a honeycomb unit, the method comprising:
   obtaining a honeycomb molded body comprising a compound containing a phosphate group zeolite and an inorganic binder, the honeycomb molded body having a plurality of through holes that are defined by cell walls and arranged in a longitudinal direction of the honeycomb molded body;
   drying the honeycomb molded body;
   firing the dried honeycomb molded body to obtain the honeycomb unit; and
   storing at least one of the honeycomb unit and the dried honeycomb molded body so that a difference in moisture content is approximately 5 mass % or less between a moisture content of the cell walls at a center part of a cross section perpendicular to the longitudinal direction and a moisture content of the cell walls at an outer periphery part of the cross section perpendicular to the longitudinal direction,
   wherein the storing step of the dried honeycomb molded body comprises allowing air to flow through the plurality of through holes, the air having humidity that is approximately 20% RH or more and approximately 60% RH or less.

2. The method for manufacturing a honeycomb structural body as claimed in claim 1, wherein the dried honeycomb molded body is stored inside a dessicator or a vacuum container.

3. The method for manufacturing a honeycomb structural body as claimed in claim 1, wherein the honeycomb unit is stored inside a dessicator or a vacuum container.

4. The method for manufacturing a honeycomb structural body as claimed in claim 1, further comprising:
   obtaining a honeycomb unit aggregate including a plurality of honeycomb units; and
   storing the honeycomb unit aggregate so that a difference in moisture content is approximately 5 mass % or less between a moisture content of the cell walls at a center part of a cross section perpendicular to the longitudinal direction and a moisture content of the cell walls at an outer periphery part of the cross section perpendicular to the longitudinal direction.

5. The method for manufacturing a honeycomb structural body as claimed in claim 4, wherein the honeycomb unit aggregate is stored inside a dessicator or a vacuum container.

6. The method for manufacturing a honeycomb structural body as claimed in claim 1, wherein the phosphate group zeolite comprises at least one of SAPO, MeAPO, and MeAPSO.

7. The method for manufacturing a honeycomb structural body as claimed in claim 6, wherein the SAPO comprises at least one of SAPO-5, SAPO-11, and SAPO-34.

8. The method for manufacturing a honeycomb structural body as claimed in claim 1, wherein the phosphate group zeolite comprises a zeolite ion-exchanged with at least one of Cu and Fe.

9. The method for manufacturing a honeycomb structural body as claimed in claim 1, wherein the inorganic binder comprises a solid comprising one of alumina sol, silica sol, titanic sol, soluble glass, sepiolite, attapulgite, and boehmite.

10. The method for manufacturing a honeycomb structural body as claimed in claim 1, wherein the compound further comprises at least one of an inorganic fiber and a scale-like material.

11. The method for manufacturing a honeycomb structural body as claimed in claim 10,
   wherein the inorganic fiber comprises at least one of alumina fiber, silica fiber, silicon carbide fiber, silica alumina fiber, glass fiber, potassium titanate fiber, and aluminum borate fiber, and wherein the scale-like material comprises at least one of glass, muscovite, alumina, silica, and zinc oxide.

12. The method for manufacturing a honeycomb structural body as claimed in claim 8, wherein the ion exchange amount is approximately 1.0 to approximately 5.0 mass %.

13. The method for manufacturing a honeycomb structural body as claimed in claim 1, wherein the honeycomb unit has a zeolite content by weight per apparent volume from approximately 230 g/L to approximately 360 g/L.

14. The method for manufacturing a honeycomb structural body as claimed in claim 1, wherein a content of the inorganic binder is approximately 5 mass % to approximately 30 mass % as solid content.

15. The method for manufacturing a honeycomb structural body as claimed in claim 10, wherein a content of the inorganic fiber and the scale-like material is approximately 3 mass % to approximately 50 mass %.

16. The method for manufacturing a honeycomb structural body as claimed in claim 1, wherein the difference in moisture content is approximately 3 mass % or less between a cell wall at an outer periphery part of a cross section perpendicular to the longitudinal direction and a moisture content of a cell wall at a center part of the cross section perpendicular to the longitudinal direction.

17. The method for manufacturing a honeycomb structural body as claimed in claim 1, wherein a firing temperature of the honeycomb molded body is approximately 600° C. to approximately 1200° C.

18. The method for manufacturing a honeycomb structural body as claimed in claim 1, wherein the honeycomb structural body comprises a single honeycomb unit.

19. The method for manufacturing a honeycomb structural body as claimed in claim 1, wherein an outer peripheral coating layer is formed on an outer peripheral surface of the honeycomb structural body.

20. The method for manufacturing a honeycomb structural body as claimed in claim 1, wherein the honeycomb unit has a porosity of approximately 25% to approximately 40%.

21. The method for manufacturing a honeycomb structural body as claimed in claim 1, wherein an aperture ratio of a cross section of the honeycomb unit perpendicular to the longitudinal direction of the honeycomb unit is approximately 50% to approximately 75%.

22. The method for manufacturing a honeycomb structural body as claimed in claim 1, wherein a density of the through holes of the cross section perpendicular to the longitudinal direction of the honeycomb unit is approximately 31 units per $cm^2$ to approximately 124 units per $cm^2$.

23. The method for manufacturing a honeycomb structural body as claimed in claim 1, wherein a thickness of each of the cell walls is approximately 0.10 mm to approximately 0.50 mm.

24. A method for manufacturing an exhaust gas converting apparatus, comprising:
manufacturing a honeycomb structural body by using the method for manufacturing a honeycomb structural body as claimed in claim 1; and
installing the honeycomb structural body into a metal container in a state where a holding sealing member is provided at a periphery of the honeycomb structural body.

25. The method for manufacturing an exhaust gas converting apparatus as claimed in claim 24, wherein the dried honeycomb molded body is stored in a dessicator or a vacuum container.

26. The method for manufacturing an exhaust gas converting apparatus as claimed in claim 24, wherein the honeycomb unit is stored in a dessicator or a vacuum container.

27. The method for manufacturing an exhaust gas converting apparatus as claimed in claim 24, further comprising:
obtaining a honeycomb unit aggregate including a plurality of honeycomb units;
storing the honeycomb unit aggregate so that a difference in moisture content is approximately 5 mass % or less between a moisture content of the cell walls at a center part of a cross section perpendicular to the longitudinal direction and a moisture content of the cell walls at an outer periphery part of the cross section perpendicular to the longitudinal direction.

28. The method for manufacturing an exhaust gas converting apparatus as claimed in claim 27, wherein the honeycomb unit aggregate is stored in a dessicator or a vacuum container.

29. The method for manufacturing an exhaust gas converting apparatus as claimed in claim 24, wherein the phosphate group zeolite comprises at least one of SAPO, MeAPO, and MeAPSO.

30. The method for manufacturing an exhaust gas converting apparatus as claimed in claim 29, wherein the SAPO comprises at least one of SAPO-5, SAPO-11, and SAPO-34.

31. The method for manufacturing an exhaust gas converting apparatus as claimed in claim 24, wherein the phosphate group zeolite comprises a zeolite ion-exchanged with at least one of Cu and Fe.

32. The method for manufacturing an exhaust gas converting apparatus as claimed in claim 24, wherein the inorganic binder comprises a solid comprising at least one of alumina sol, silica sol, titania sol, soluble glass, sepiolite, attapulgite, and boehmite.

33. The method for manufacturing an exhaust gas converting apparatus as claimed in claim 24, wherein the compound further comprises at least one of an inorganic fiber and a scale-like material.

34. The method for manufacturing an exhaust gas converting apparatus as claimed in claim 33, wherein the inorganic fiber comprises at least one of alumina fiber, silica fiber, silicon carbide fiber, silica alumina fiber, glass fiber, potassium titanate fiber, and aluminum borate fiber, and
wherein the scale-like material comprises at least one of glass, muscovite, alumina, silica, and zinc oxide.

35. The method for manufacturing an exhaust gas converting apparatus as claimed in claim 32, wherein the ion exchange amount is approximately 1.0 to approximately 5.0 mass %.

36. The method for manufacturing an exhaust gas converting apparatus as claimed in claim 24, wherein the honeycomb unit has a zeolite content by weight per apparent volume from approximately 230 g/L to approximately 360 g/L.

37. The method for manufacturing an exhaust gas converting apparatus as claimed in claim 24, wherein the content of the inorganic binder is approximately 5 mass % to approximately 30 mass % as solid content.

38. The method for manufacturing an exhaust gas converting apparatus as claimed in claim 33, wherein a content of the inorganic fiber and the scale-like material is approximately 3 mass % to approximately 50 mass %.

39. The method for manufacturing an exhaust gas converting apparatus as claimed in claim 24, wherein the difference in moisture content is approximately 3 mass % or less between a moisture content of a cell wall at an outer periphery part of a cross section perpendicular to the longitudinal direction and a moisture content of a cell wall at a center part of the cross section perpendicular to the longitudinal direction.

40. The method for manufacturing an exhaust gas converting apparatus as claimed in claim 24, wherein a firing temperature of the honeycomb molded body is approximately 600° C. to approximately 1200° C.

41. The method for manufacturing an exhaust gas converting apparatus as claimed in claim 24, wherein the honeycomb structural body comprises a single honeycomb unit.

42. The method for manufacturing an exhaust gas converting apparatus as claimed in claim 24, wherein an outer peripheral coating layer is formed on an outer peripheral surface of the honeycomb structural body.

43. The method for manufacturing an exhaust gas converting apparatus as claimed in claim 24, wherein the honeycomb unit has a porosity of approximately 25% to approximately 40%.

44. The method for manufacturing an exhaust gas converting apparatus as claimed in claim 24, wherein an aperture ratio of a cross section of the honeycomb unit perpendicular to the longitudinal direction is approximately 50% to approximately 75%.

45. The method for manufacturing an exhaust gas converting apparatus as claimed in claim 24, wherein a density of the through holes of the cross section perpendicular to the longitudinal direction of the honeycomb unit is approximately 31 units per cm$^2$ to approximately 124 units per cm$^2$.

46. The method for manufacturing an exhaust gas converting apparatus as claimed in claim 24, wherein a thickness of each of the cell walls is approximately 0.10 mm to approximately 0.50 mm.

47. The method for manufacturing an exhaust gas converting apparatus as claimed in claim 24, wherein an ejector to eject ammonia or a precursor of the ammonia is provided at an upstream side of the honeycomb structural body.

48. The method for manufacturing an exhaust gas converting apparatus as claimed in claim 47, wherein the precursor of the ammonia comprises urea water.

49. The method for manufacturing an exhaust gas converting apparatus as claimed in claim 24, wherein the exhaust gas converting apparatus is obtained by firing after canning the honeycomb structural body to a metal pipe in a state where the holding sealing member is provided at an outer peripheral part of the honeycomb molded body.

50. The method for manufacturing a honeycomb structural body as claimed in claim 1, further comprising:

obtaining a honeycomb unit aggregate including a plurality of honeycomb units; and storing the honeycomb unit aggregate so that a difference in moisture content is approximately 5 mass % or less between a moisture content of the cell walls at a center part of a cross section perpendicular to the longitudinal direction and a moisture content of the cell walls at an outer periphery part of the cross section perpendicular to the longitudinal direction.

\* \* \* \* \*